(12) United States Patent
Dale

(10) Patent No.: US 10,093,560 B2
(45) Date of Patent: Oct. 9, 2018

(54) ELECTRO-CHEMICAL FILTER APPARATUS

(71) Applicant: Radical Filtration Limited, Cheshire (GB)

(72) Inventor: Jason Jonathan Dale, Cheshire (GB)

(73) Assignee: PERMASCAND AB, Ljungaverk (SE)

( * ) Notice: Subject to any disclaimer, the term of this patent is extended or adjusted under 35 U.S.C. 154(b) by 338 days.

(21) Appl. No.: 14/787,063

(22) PCT Filed: Apr. 25, 2014

(86) PCT No.: PCT/GB2014/051297
§ 371 (c)(1),
(2) Date: Oct. 26, 2015

(87) PCT Pub. No.: WO2014/174309
PCT Pub. Date: Oct. 30, 2014

(65) Prior Publication Data
US 2016/0090314 A1    Mar. 31, 2016

(30) Foreign Application Priority Data

Apr. 25, 2013 (GB) .................................. 1307442.2

(51) Int. Cl.
*C02F 1/46* (2006.01)
*C02F 1/461* (2006.01)
(Continued)

(52) U.S. Cl.
CPC .......... *C02F 1/46109* (2013.01); *C02F 1/001* (2013.01); *C02F 1/44* (2013.01); *C02F 1/4672* (2013.01); *C02F 1/46104* (2013.01); *C02F 2001/46147* (2013.01); *C02F 2001/46157* (2013.01); *C02F 2001/46161* (2013.01); *C02F 2001/46171* (2013.01); *C02F 2201/003* (2013.01); *C02F 2201/46115* (2013.01)

(58) Field of Classification Search
None
See application file for complete search history.

(56) References Cited

U.S. PATENT DOCUMENTS 3,915,822 A   10/1975 Veltman
4,014,767 A    3/1977 Schmidt
(Continued)

FOREIGN PATENT DOCUMENTS

CN    1299782 A   6/2001
CN    1613787 A   5/2005
(Continued)

OTHER PUBLICATIONS

International Search Report and Written Opinion for corresponding Patent Application No. PCT/IB2012/002829 dated Aug. 27, 2014.
(Continued)

*Primary Examiner* — Arun S Phasge
(74) *Attorney, Agent, or Firm* — Renner, Otto, Boisselle & Sklar, LLP

(57) ABSTRACT

The invention provides a process apparatus and associated method comprising at least one elongate hollow semi-permeable member, at least one anode and at least one cathode. The anode and cathode are arranged radially and concentrically with respect to the semi-permeable member.

24 Claims, 10 Drawing Sheets

(51) Int. Cl.
*C02F 1/44* (2006.01)
*C02F 1/00* (2006.01)
*C02F 1/467* (2006.01)

(56) References Cited

U.S. PATENT DOCUMENTS

| | | | |
|---|---|---|---|
| 4,149,957 | A | 4/1979 | Gibson et al. |
| 2003/0102211 | A1 | 6/2003 | Nakamura et al. |
| 2005/0109610 | A1 | 5/2005 | Inamoto et al. |
| 2009/0001027 | A1 | 1/2009 | Carew |
| 2011/0308953 | A1 | 12/2011 | Bazant et al. |
| 2013/0146474 | A1* | 6/2013 | Sullivan .................... C25B 1/26 205/510 |

FOREIGN PATENT DOCUMENTS

| | | |
|---|---|---|
| EP | 1 108 683 A2 | 6/2001 |
| GB | 759275 A | 10/1956 |
| JP | H06 328081 A | 11/1994 |

OTHER PUBLICATIONS

Examination report for corresponding Australian Patent Application No. 2014259153 dated Oct. 18, 2017.
Combined Search and Examination Report for corresponding United Kingdom Patent Application No. GB1307442.2 dated Apr. 23, 2014.
Search Report for corresponding United Kingdom Patent Application No. GB1307442.2 dated Jun. 29, 2015.
Examination Report for corresponding United Kingdom Patent Application No. GB1307442.2 dated Oct. 5, 2015.
Translation of Office Action for corresponding Chinese Patent Application No. 201480023761.7 dated Jan. 10, 2017.
International Preliminary Report on Patentability for corresponding Patent Application No. PCT/GB2014/051297 dated Nov. 5, 2015.
Written Opinion for corresponding Singapore Patent Application No. 11201508762R dated Aug. 9, 2016.
Examination Report for corresponding Vietnamese Patent Application No. 1-2015-04487 dated Mar. 1, 2016.

* cited by examiner

ELECTRO-CHEMICAL FILTER APPARATUS

This application is a national phase of International Application No. PCT/GB2014/051297 filed Apr. 25, 2014 and published in the English language.

OVERVIEW

The present invention relates generally to a process for the treatment of a liquid contaminated or polluted with unwanted organisms such as organic or non-organic contaminants. The invention relates specially, but not exclusively, to the treatment of seawater, contaminated water or polluted water.

BACKGROUND

A wide range of unwanted organisms, organic and non-organic compounds are found in natural, industrial and municipal waters including seawater. Some of these pollutants pose severe problems due to their resistance to biodegradation and/or toxic effects or can cause undesirable effects when used in a further process or if discharged into a new environment. Removal or neutralisation of these contaminants is therefore desirable and is most often required by law before proceeding.

Numerous primary, secondary and even tertiary processes are currently employed for the treatment of these polluted waters leading to the removal or neutralisation of the pollutants. They include physical and chemical processes such as precipitation, filtration, and treatment with chlorine, ozone, ultra-violet sterilisation, to name but a few.

However, the applications of these mechanical and chemical processes are not without challenges. For instance, filtration alone to a high degree requires high pressure losses and thus lost energy. Inefficient mixing, injection and application of treatment chemicals leads to a treatment overdosing which adds to operating costs and can create further problems with disposal of by-products. Electrochemical processes, where used, are generally inefficient, bulky, have high capital cost and consume high amounts of energy.

The present invention provides an alternative solution to those presently available and specifically provides an improved process apparatus with a number of technical advantages.

SUMMARY OF THE INVENTION

Aspects of the invention are set out in the accompanying claims.

Viewed from first aspect there is provided a process apparatus comprising at least one elongate hollow semi-permeable member, at least one anode and at least one cathode wherein the anode and cathode are arranged radially and concentrically with respect to the semi-permeable member.

Thus, according to the present invention there is provided an unconventional arrangement wherein at least one anode and cathode pair or group are located around a hollow semi-permeable member. Such a hollow semi-permeable member can advantageously function as a conventional filter to separate debris from a liquid flowing there-through. The concentrically and radially located anodes and cathodes provide a means to perform electrolysis on the water or liquid immediately adjacent to the semi-permeable member.

Such an arrangement can advantageously provide a compact process apparatus arrangement incorporating conventional filtration and an integrated and compact electrolysis function.

In effect adjacent anodes and cathodes alternate between cathode and an anode to define one or a plurality of electrolysis zones there-between.

The sequence of anodes and cathodes can be selected according to the particular application which may be determined based on desired capacity of water or liquid flow for example. The anticipated composition of the water or liquid may additionally determine the configuration of the anodes and cathodes. Advantageously the anode/cathode arrangement or sequence when viewed radially inwards or outwards from the elongate hollow semi-permeable member may be selected from the following:

(i) Cathode, Anode;
(ii) Anode, Cathode;
(iii) Anode, Cathode, Anode;
(iv) Cathode, Anode, Cathode;
(v) Anode, Cathode, Anode, Cathode;
(vi) Cathode, Anode, Cathode, Anode;
(vii) Cathode, Anode, Cathode, Anode, Cathode; or
(viii) Anode, Cathode, Anode, Cathode, Anode.

Additionally, or alternatively, the hollow semi-permeable member itself may be formed as a cathode or anode. This advantageously allows the apparatus to be made even smaller by integrating one of the anodes/cathodes with the filter function. Alternatively, viewed another way, this can increase the processing capacity of an apparatus of a given size such as outside diameter or elongate length. Many applications of process apparatus can benefit substantially from equipment with a small volume or size.

For example the hollow semi-permeable member may be a hollow and semi-permeable cathode and an anode may be located radially and concentrically with respect thereto. Additionally a cathode may be located radially and concentrically with respect to the anode to define an anode/cathode pair or group.

In an alternative arrangement the hollow semi-permeable member may be a hollow and semi-permeable anode and a cathode may be located radially and concentrically with respect thereto.

In order to maximise the electrolysis zone(s) the anodes and or cathodes may advantageously extend around substantially the entire circumference of an adjacent anode or cathode.

Structural strength may be provided for example by dividing the apparatus into discrete portions. For example circumferentially the anode/cathode may be divided into discrete sections by means of electrically isolating spacers. Adjacent anodes and cathodes may then extend as curved or flat parts between adjacent electrically isolating spacers. In effect groups of anodes and cathodes may be defined. For example, 2 or more electrically isolating spacers may be provided, dividing the apparatus into 2 or more discrete radial flow paths.

The way water or liquid is introduced into the apparatus may be selected depending on the particular application. For example one or both ends of the elongate semi-permeable member may be open and arranged in use to permit water or liquid to flow there-through. Thus, in one arrangement water or liquid can be introduced from both opposing ends of the hollow member. This increases the amount of water or liquid that can be introduced and/or permits two different and possibly independent sources of water or liquid to be introduced into the apparatus either independently or simultaneously.

Alternatively the semi-permeable member may be in the form of a blind hole thereby directing water or liquid introduced into the member radially outwards.

In an alternative configuration the apparatus may be adapted, by means of a suitable housing and inlet and outlet ports such that liquid flows into the apparatus radially inwards through a wall of the semi-permeable elongate member and out of the apparatus along the elongate axis of the semi-permeable elongate member. In effect the flow is reversed.

The anodes and cathodes may be located circumferentially and radially around the elongate hollow semi-permeable member, that is on the outside of the member. Alternatively, and optionally in combination with the reverse flow discussed above, the anodes and/or cathodes may be arranged circumferentially and radially within the elongate hollow semi-permeable member. This permits a very compact apparatus to be constructed.

The anodes and cathodes may be formed in a number of configurations with respect to the water or liquid flow on which electrolysis is performed. For example the anodes/cathodes may be in the form of a mesh or gauze form such that water or liquid may conveniently pass there-through whilst optimising the contact area of the anodes and cathodes.

Advantageously the anodes and cathodes should be separated by a distance selected so as to optimise the electrolysis for the given application. In this particular apparatus it has been established that for electrolysis in water for example the separation of adjacent anodes and cathodes may be between 0.1 and 10 mm.

The anodes and cathodes are advantageously controlled by means of a suitable electrical controller such that they can be electrically energised to cause electrolysis to occur. Thus, at least one anode and adjacent cathode may be activated by means of an electrical supply arranged in use to generate potential difference and an electrical current between an anode and an adjacent cathode.

The controller may be adapted to permit independent control of anodes and or cathodes which may be arranged in pairs or in groups or alternatively regions around and/or along the apparatus. Thus, pairs or groups of adjacent anodes and cathode may define electrode pairs or groups and the electrode pairs or groups may be independently and selectively electrically activated. This advantageously provides a highly controllable apparatus in response to indications such as water or liquid contents/contamination. It also facilitates efficient operation of the process apparatus.

The controller may further be adapted to permit the polarity of an electrical supply one or more anode and/or cathode to be reversed to cause an opposite potential difference and electrical current between a respective anode and cathode. This permits the anodes and cathodes to be 'cleaned' by polarity reversal which is described later.

The anodes and cathodes may be formed from a range of materials adapted according to the application of the process apparatus. Advantageously the anode for example may be formed of a conductive substrate and an outer coating. Specially, the anode may be a dimensionally stable anode (DSA) formed of a substrate coated with precious metals selected for example from platinum, gold, silver or a mixed metal oxide solution of precious metals including the previously mentioned metals and others such as Iridium, Palladium, Osmium, Ruthenium, Platinum, Rhodium or Tantalum. Alternatively the anode may be a boron doped diamond anode (BDD) formed from a substrate coated with boron doped diamond.

Additionally, the cathode may be formed of a conductive substrate and optionally an outer coating.

The anode and/or cathode substrate and/or coatings material for one electrode pair or group may be the same or may be dissimilar to the anode and/or cathode substrate and/or coating material of another electrode pair or group. This provides for a versatile process apparatus.

The controller may be advantageously adapted to receive a number of inputs which may be used alone or in combination to control the anodes and cathodes. The inputs may be from suitable detectors arranged within the apparatus or alternatively, or additionally, within an upstream or downstream flow path of the water or liquid entering or leaving the apparatus. This thereby provides a control loop to, for example, continuously monitor and control the electrolysis within the apparatus to achieve the desired output characteristics.

The cathodes and anodes may be independently and simultaneously controlled in response to these detected inputs. For example, the process apparatus may, as described above, comprise differing pairs or groups of anodes and cathodes with different electrolytic properties so as to achieve different chemical reactions. The controller may then make a determination as to the water or liquid flow through the apparatus and control the anodes/cathodes according to a predetermined desired output. Similarly, any deviation from a desired output may advantageously be detected and remedial action taken by the controller by controlling the anode/cathodes accordingly.

The detector may be adapted to detect a number of properties. Advantageously in a water application the detector may be adapted to detect the conductivity of the water and the control system may then automatically act to switch between different electrode pairs or groups when needed as described above. Or alternatively, or additionally, the detector may be adapted to detect any residual chemical concentrations or other variables prior to or following the process apparatus and adjustments can be automatically made to the applied electrical voltage and current depending on the local polluted water or liquid conditions. Residual chemical concentrations depend on the water or liquid under treatment and its contents and may be those of unused oxidants such as Fluorine, Hydroxyl Free Radicals, forms of Oxygen, Ozone, Hydrogen Peroxide, Hypochlorite, Chlorine and Total Residual Oxidants.

The process apparatus itself may be provided with a single semi-permeable elongate member so as to provide a highly compact process apparatus. Alternatively a plurality of elongate hollow semi-permeable members and plurality of cathode and anode pairs or groups associated therewith may be provided to increase the capacity of the apparatus. These may be arranged within one compact unit having a common inlet/outlet or separately as a battery of single units and the plurality of elongate hollow semi-permeable members may be arranged to allow water or liquid flow in series or in parallel or recirculated.

It will be recognised that aspects of the invention extend to methods of using and operating the process apparatus described above including, but not restricted to, a method of processing a water or liquid by causing a water or liquid to pass through an apparatus as described herein.

DESCRIPTION OF THE FIGURES

Embodiments of the invention will now be described, by way of example only, with reference to the accompanying Figures in which.

Figure 1A:
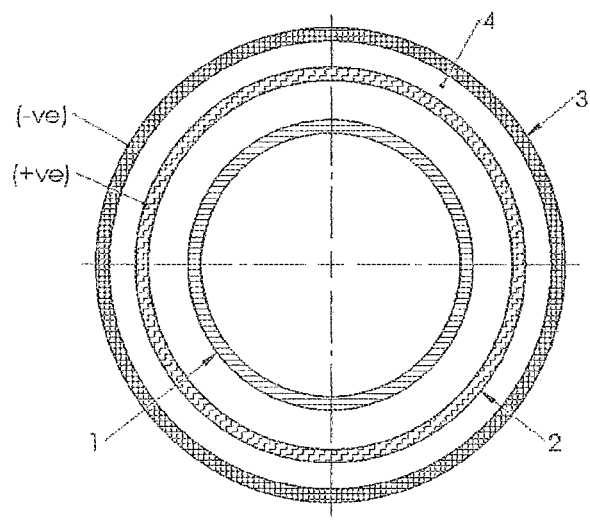
FIGS. 1a to 1g illustrates how the electrode pairs or groups are aligned in a novel non-obvious way to the hollow semi-permeable member with the various configurations disclosed.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the spirit and scope of the claimed invention.

DETAILED DESCRIPTION

As discussed herein the present invention provides a more efficient, compact approach leading to a reduction in power requirements and a more economic treatment of large volumes of polluted water or liquid. In particular, the removal or neutralisation of the pollutants in the treated water or liquid.

In the present invention, the first integrated sub-system comprises a physical solid-liquid separation step that removes relatively larger organisms, organic and non-organic pollutants from a polluted water or liquid above a defined filtration size specification. The physical solid-liquid separation step comprises at least one but advantageously several hollow semi-permeable members functioning as filtration element(s) arranged in a common housing having a common main inlet/outlet into which the polluted water or liquid enters and exits.

The filtration elements may be flat but are advantageously arranged to be hollow in order to take advantage of space and surface area considerations and promote a more compact design. The hollow filtration elements may be open at one end and closed at the other or they may be open at both ends to form filtration element inlets that accept the polluted water or liquid. In this case the direction of the flow of polluted water or liquid is from inside to outside the hollow filtration element. Or alternatively, the polluted water or liquid may flow in a direction from outside to inside the hollow filtration element and the ends of the hollow filtration element may form filtration element outlets.

Advantageously the arrangement of the hollow filtration element(s) acts to divert the polluted water or liquid flow in a generally perpendicular or radial direction to and through the filtration element surface of each filtration element. As the area of the filtration element surface is preferably greater in area than the total cross sectional area of the filtration element inlet(s) or outlet(s) to the hollow filtration element, the speed of the water or liquid is significantly reduced in the vicinity of the filtration element surface.

The hollow filtration element(s) may be constructed by, but not limited to, a metal weave-wire sintered screen method where multiple metal screen layers are sintered together with supporting structures to create a strong filtration element that is able to support its own weight. Or, the hollow filtration element may be constructed from, but not limited to, advanced 3D weaving technologies whereby multiple metal screen layers are woven tightly together to support each other without the need for additional sintering or support.

Alternatively, other types of filtration element design may be incorporated. Such filtration element(s) may be constructed from, but not limited to, natural or processed fibre, man-made organic or synthetic materials, ferrous and non-ferrous metals, glass, activated or natural carbon, ceramics, papers and plastics, sheet or woven materials, non-woven materials, pleated melt-spun materials, inorganic bonded porous media, mineral wools, glass fibre, carbon fibre, woven wire and screens, sintered wire mesh, perforated plate, wedge wire and membrane type of designs or any combination thereof.

For the filtration element(s), the filtration size specification is determined according to the organism, organic or non-organic properties that are required to be filtered. Thus, the filtration size (that is the size of the holes or flow paths through the filtration element surface of the filtration element) may be any suitable size depending on the desired filtration level. For example the filtration size of the filtration elements may be selected but not restricted to be <1, 1, 10, 20, 30, 40, 50, 75, 100, 250, 500 microns or may be much greater such as 1 mm, 5 mm, 10 mm and higher depending on the selected application.

As the polluted water or liquid flow passes in a generally perpendicular direction to and through the filtration element surface of the filtration element(s), any organisms, organic or non-organic pollutants greater in size than the filtration size specification may not pass through the filtration element surface and are trapped on the filtration surface of the filtration element and begin to form what is known as a 'cake' of filtered matter. As the cake of filtered matter begins to build, the pressure loss over the filtration element increases thereby requiring the cake of matter to be frequently cleaned off the filtration element surface of the filtration element if filtration efficiency is to be maintained.

The cake of filtered matter may be removed by reverse flushing or by dismantling the novel process apparatus and cleaning the filtration elements manually or by machine. Alternatively, this cleaning process may advantageously be achieved through the use of an automatic backwashing mechanism incorporated and integrated into the apparatus. Thus, an automatic backwashing filtration process which may be configured for continuous cleaning can be realised. Alternatively it may be triggered only when the pressure differential or pressure loss reaches a certain monitored level or triggered at present intervals or manually.

Various automatic backwashing mechanisms and processes may be incorporated into the apparatus described herein which allow the filtration element to be cleaned through reverse high speed water flow through the filtration element surface. This reverse high speed water flow strips the cake of matter from the filtration surface of the filtration element and carries it away to be disposed of safely. If however, the backwash flow contains residual chemicals, the backwash flow can be appropriately neutralised before disposal. This automatic backwashing process can be performed whilst the filtration element is in use thus allowing the filtration element to continuously filter water whilst being cleaned. Disclosure of such automatic backwashing processes and mechanisms are incorporated herein by reference to WO2006/008729 and WO2011/058556.

In the disclosed invention, the filtration elements may be flat or have any cross-sectional shape or profile such as oval, square, triangular, star or other shapes, but preferably, the filtration elements are provided with a circular cross section to optimise and simplify the design of the preferred automatic backwashing mechanism and the second integrated sub-system.

In the present invention, the second integrated sub-system comprises a chemical disinfection step whereby the water or liquid and the remaining organisms and organic and non-organic contaminants are exposed to the highly reactive products of an advanced oxidation process (AOP), such as, but not limited to hydroxyl free radicals (OH.), Ozone ($O_3$) and Hydrogen Peroxide ($H_2O_2$).

Exposure of the organisms and organic and non-organic pollutants to the highly reactive products of the AOP effectively and efficiently neutralises the pollutants through oxidation. In addition, more persistent but not as reactive oxidative species such as Chlorine or Total Residual Oxidants (TRO) may also be produced and used to treat the polluted water or liquid.

Oxidation in this sense is defined as the transfer of one or more electrons from an electron donor (reductant) to an electron acceptor (oxidant), which has a higher affinity for electrons. This electron transfer results in the chemical transformation of both the oxidant and the reductant, in some cases producing chemical species with an odd number of valence electrons. These chemical species, known as radicals, tend to be highly unstable and, therefore, highly reactive because one of their electrons is unpaired. Oxidation reactions that produce radicals tend to be followed by additional oxidation reactions between the radical oxidants and other reactants (both organic and inorganic) until thermodynamically stable oxidation products are formed.

One of the most powerful oxidants produced by an AOP are OH. radicals. The OH. radical is extremely reactive and is well known as a disinfection agent. The OH. radical is the single most important oxidising species found in nature, able to neutralise a vast number of chemicals and attack the porous cell walls of organisms, bacteria and viruses which further destroys them. However, as the OH. radical is so reactive, it is stated that it is only effective within a very short distance from where they are produced. In general, the effectiveness of an AOP is proportional to its ability to generate large quantities of OH. radicals and there are several methods for generation of OH. radicals available in the prior art, however, in the disclosed invention the preferred method is through the use of an electrolysis method.

The electrolysis method produces various oxidisers depending on the electrolyte (the water or liquid under treatment), the material of the electrodes and the overvoltage or standard potential applied to the electrodes. For example, the following reactions may take place when salt (NaCl) is present in water.

| | Reactant | Standard Potential | Reaction |
|---|---|---|---|
| Anodic Reaction | | | |
| OH• | $H_2O$ | 2.85 V | $H_2O \rightarrow OH + H^+ + e^-$ |
| O• | $H_2O$ | 2.42 V | $H_2O \rightarrow O + 2H^+ + 2e^-$ |
| $O_3$ | $H_2O$ | 2.08 V | $H_2O + O_2 \rightarrow O_3 + 2H^+ + 2e^-$ |
| $H_2O_2$ | $H_2O$ | 1.78 V | $2H_2O \rightarrow H_2O_2 + 2H^+ + 2e^-$ |
| $Cl_2$ | $Cl^-$ | 1.36 V | $2Cl^- \rightarrow Cl_2 + 2e^-$ |
| $O_2$ | $H_2O$ | 1.23 V | $2H_2O \rightarrow O + 4H^+ + 4e^-$ |
| Cathodic Reaction | | | |
| $H_2$ | $H_2O$ | 0.00 V | $2H_2O + 2e^- \rightarrow H_2 + 2OH^-$ |
| $H_2O_2$ | $O_2$ | −0.15 V | $O_2 + 2H_2O + 2e^- \rightarrow H_2O_2 + 2OH^-$ |

Source: Kraft, A. et al, Electrochemical water disinfection in Transworld Research Network, 2003, p27-55

In a particularly effective electrolysis method the apparatus may be adapted such that an electrolytic cell utilises at least one distinct electrode pair, said electrode pair comprising an anode and cathode. When only one anode and cathode is used the electrode pair can be arranged according to the invention so that the treated water firstly encounters an anode and then subsequently encounters a cathode. Prior art has found that this promotes and enhances additional reactions between reaction products generated at the anode allowing them to react further with reaction products generated at the cathode.

It has also been established that it helps to reduce the formation of Trihalomethanes (THM) and other toxic chlorinated products in chloride containing water such as seawater by promoting further side reactions that transform toxic products into non-toxic products and help to further disinfect the water of microorganisms.

According to one embodiment of the invention the definition of the electrode pair may be extended to include two cathodes per anode to form an electrode group, with the anode preferably located between the two cathodes. In this case the water firstly encounters a cathode, then an anode, then a cathode. A benefit of this arrangement is that the reaction products generated at the first cathode are immediately mixed with the reaction products generated at the anode surface facing the direction of the water flow, whereas the reaction products generated at the anode surface not facing the direction of the water flow are immediately mixed with the reaction products generated at the second cathode. In this way both the areas of the front and back sides of the anode may be utilised in the most economical way.

The space in-between the cathodes and anodes will form an electrolysis zone. The distance between the anode and cathode of the electrode pair or the electrode group is preferably small and between tenths of a millimeter to a few millimeters. The major reason for this is to ensure that the highly reactive products of the AOP are in close proximity to each other. A further reason is to minimise voltage and current levels and thus power required for the AOP.

The above arrangement is not limited to a single layer of electrode pairs and can be further extended to include multiple layers of electrode pairs or groups effectively arranged so that the polluted water meets the multiple electrode pairs or groups in series. If more than one electrode pair or electrode group in series is utilised then the minimum distance between each subsequent electrode pair or electrode group is preferably larger than the distance between the anode and cathode(s) of the preceding electrode pair or electrode group to ensure that each electrode pair or electrode group functions independently. This spacing can be achieved by a suitable assembly or mounting that supports the electrodes and maintains the correct positions relative to each other. Non-conducting spacer's in-between the anode and cathode may be utilised to maintain the correct dimensions of the electrolysis zone.

The electrolytic cell also comprises a means for applying a voltage across the anode and cathode and the means for supplying a direct current (DC) to the electrode pair or electrode group. The means of applying the voltage and current may be provided by a conventional rectifier or some other method. Depending on the conductivity of the polluted water stream the parameters of the supplied voltage and direct current can be manipulated with the rectifier to obtain optimum conditions. The electrical connection between the electrodes and the supply of electrical voltage and current may be monopolar (connected in parallel) such that the current load and cell voltage of each electrode pair can be adjusted individually or it may be bipolar (connected in series) depending on the preferred trade-off between current efficiency versus voltage efficiency.

The electrolytic cell may advantageously incorporate an additional mechanism for cleaning the electrodes. In particular, to clean the cathode of unwanted cathodic deposits that are typically encountered in electrolytic cells of this nature. It has been established that this may be achieved by polarity reversal (PR) or by cleaning in place (CIP). For polarity reversal, the same material is used for both the anode and the cathode and the electrical current is reversed in polarity when the cathodic deposits have started to affect the efficiency of the electrolytic cell. When the electrical current is reversed in polarity, the cathode becomes an anode and the clean anode becomes a cathode, therefore each electrode has a dual function. The disadvantage with PR is that the cost of the electrolytic cell increases as both the anode and the cathode require appropriate protective surface coatings. For the CIP method, separate anodes and cathodes are utilised having only a single function and the cathodic deposits are removed with the introduction of for instance an acid that is brought into contact with the electrodes and left for a period of time. Once the cathodic deposits are dissolved by the acid, the electrolytic cell is emptied and normal electrolysis begins again. For the CIP method, only the anode requires appropriate surface coatings which are typically expensive, thus the cost is reduced.

In addition, if an electrode group described earlier, consisting of a cathode followed by an anode followed by a cathode is utilised, the cathode surface area is increased and the cathode current density (which may be described as amps per m$^2$) is reduced. This reduces the growth of cathode deposits and the requirement for cleaning since for the cathode deposits, the growth rate versus. current density has a known defined relationship.

Materials such as but not limited to titanium, tantalum, tungsten, molybdenum or niobium, iridium, ruthenium, palladium, stainless steel, nickel, silicon, glassy carbon, graphite, polymeric, carbides, conductive ceramics and composites such as Ebonex are a few common electrode materials that are utilised. For the anode, a dimensionally stable anode (DSA) may be manufactured by utilising one of the above materials as a substrate and surface coating the substrate material with precious metals such as platinum, gold, silver or a mixed metal oxide solution of precious metals including the previously mentioned metals and others such as Iridium, Palladium, Osmium, Ruthenium, Platinum, Rhodium or Tantalum. However, the latest developments in electrode material and electrode structure have allowed OH. radicals to be produced much more efficiently by an AOP. In particular a boron doped diamond (BDD) anode offers significant advantages where one of the above materials may be utilised as the substrate and is surface coated with boron doped diamond films. For the cathode, a similar coating to the anode may be used or the cathode may be uncoated depending on the cleaning method described above.

BDD electrodes are extremely stable, have excellent corrosion properties and possess unique electrochemical properties allowing a much larger electrochemical potential window than other electrodes. In comparison to a platinum coating, the electrochemical window is almost doubled. This unique property allows the generation of OH. radicals directly in the water without addition of any other chemicals or conditioning at high current efficiency with the process being easily scalable simply by adjusting the required electrical power.

In the present invention the geometric structure of the substrate for the electrodes may be permeable with an part open surface area that allows polluted water to flow through the electrode pairs or electrode groups thereby allowing the maximum surface area contact for generation of OH. radicals. The structure of the electrodes may be an expanded mesh electrode, knitted or woven mesh electrode, sintered or foamed mesh electrode, knotted electrode, dispersed electrode and reticulate electrode types.

Careful selection of the material and geometric structure of the electrodes promotes efficiency of the electrolytic process and reduces/increases the occurrence of certain reactions and unwanted by-products, for example, a reduction in the generation of Hydrogen. Or it may increase the occurrence of certain reactions, for example an increase in the production of Chlorine or Total Residual Oxidants depending on the preferred end result. The efficiency of the electrolytic process and thus the AOP may be greatly increased by the use of such 3D meshes, especially those with relatively small openings such as the knitted or woven mesh electrode as the pollutants are forced to be in very close proximity to (and are thus more likely to be reacted with) the fast reacting products at the anode, i.e. the OH. radicals.

The two sub-systems discussed above could naturally be placed in series as separate individual treatments however the inventor has found that when the individual sub-systems are integrated in a non-obvious way it provides all the highly advantageous benefits of a novel process apparatus. In particular, the efficiency of the treatment process can be increased allowing a reduction in the power requirements per cubic meter of water treated. This advantageously provides a more environmentally friendly treatment process since associated $CO_2$ production is also decreased as less power is required.

In order to attain these advantages the anode(s) and the cathode(s) are aligned in a non-obvious way. The anodes and the cathodes of the electrode pair or electrode groups of the second integrated sub-system are aligned both longitudinally and concentrically forming a concentric electrolyser zone and they are also aligned both longitudinally and concentrically to the filtration surface of the hollow filtration element of the first integrated sub-system. In the case of flat filtration surfaces the flat electrode pairs or electrodes groups are aligned with the flat filtration surfaces.

The electrode pairs or electrode groups may be positioned inside the filtration element when the water flows from outside the filtration element to inside or preferably, they may be positioned outside of the filtration element when the water flows from inside the filtration element to outside. This flow direction allows ease of construction and compactness of the automatic backwashing mechanism if this is utilised. The distance between the electrode pairs or electrode groups and the surface of the filtration element is ideally small to optimise the footprint of the process apparatus, and is typically of the same order of magnitude as the distance between cathode and anode discussed previously.

By aligning the electrode pairs or electrode groups both longitudinally and concentrically to the filtration surface of the filtration element it allows the present invention to take advantage of the aforementioned reduced water velocities and thus the increased residence times of the polluted water in the vicinity of the filtration element. Since for a given flowrate, the polluted water enters with a fixed velocity at one or both ends of the filtration element and is then spread out, slowed down and diverted in a mainly perpendicular direction to and through the filtration surface of each filtration element. As the area of the filtration surface of the filtration element is preferably greater than the area of the filtration inlet(s) (or filtration outlets if the polluted water flow is reversed) the speed of the water is significantly reduced. This allows a greater time period for the reaction products generated at the cathodes and anodes to react in the vicinity of the location where they are generated before being transported away from the electrolysis zone. This provides increased treatment efficiency of the reaction products.

As mentioned, the above arrangement is not limited to a single layer of electrode pairs or electrode groups and can be further extended advantageously to include multiple layers of electrode pairs or groups effectively arranged in series to effectively apply repeated doses of the chemical disinfection step in a single novel process apparatus. A further significant enhancement available to the disclosed invention is that two or more different electrode pairs or electrode groups may be incorporated separately in series or partially overlapping. The advantage of this is that either of the electrode pairs or electrode groups may be energised while the others are not, or all or some of the electrode pairs or electrode groups may be energised at the same time. Depending on the material and geometrical structure of the electrodes and applied voltage and current varying levels of reaction products may be generated, the quantities of which being matched to the application in hand.

For example, the combination of electrode pairs or groups may consist of a cathode, a BDD anode, a cathode, a DSA anode and finally a cathode. In this partially overlapping configuration the central cathode serves the anode on either side of it. The BDD anode functions particularly well in low conductivity waters whereas the DSA functions particularly well in water having a conductivity above 0.2% Sodium Chloride. This would allow the for instance possibility of treating very low conductivity waters with OH. radicals produced by the BDD electrodes or treatment from the production of reaction products such as Chlorine or Total Residual Oxidants (TRO) with the less expensive DSA electrodes in more conductive waters. Or, both types of reaction products may be generated simultaneously. At the time of writing, the inventor is unaware of an electrolytic cell having two or more different electrode types within a single unit and believes this to be a new invention by itself.

A more advantageous extension to the invention is obtained if the filtration element is constructed of the same material as the cathode, since this may allow the filtration element itself to act as a cathode in a single cathode anode pair or a two cathode one anode electrode group. This would provide the benefit of ensuring that the pollutants are in very close proximity to (and thus much more likely to be reacted with) the reaction products generated at the cathode if so desired, however, increased cleaning intervals may be required if the filtration element has a relatively small filtration size since the cathodic growths may act to effectively block the filtration element. This may be reduced in practice if an automatic backwashing process is applied since the automatic backwashing process continuously acts to clean the filtration element. In this tightly integrated configuration the integrated sub systems become wholly reliant on each other for operation, since, the filtration element becomes part of the electrolysis unit and the electrolysis unit becomes part of the filtration element. Accordingly, the footprint of the novel process apparatus is reduced.

An even more advantageous extension to the invention is obtained if the filtration element is allowed to function as the anode provided appropriate surface coating methods to the low filtration sizes are available. This provides an extremely advantageous effect since the pollutants are effectively forced to be in very close proximity to (and thus are much more likely to be reacted with) the highly reactive reaction products at the anode, i.e. the OH. radicals. In this case cathodic growths are not a problem since the filtration element acts as the anode. Similarly, in this tightly integrated configuration the integrated sub systems become wholly reliant on each other for operation, since the filtration element becomes part of the electrolysis unit and the electrolysis unit becomes part of the filtration element. This also permits the footprint of the novel process apparatus to be reduced.

In this configuration, care must be taken to ensure that the anode does not become clogged with pollutants, thus the automatic backwashing process if used may need to be much more frequent in order to keep the filtration surface of the filtration element clean. Further, if a more efficient AOP is applied then the filtration size specification may be able to be increased since a greater amount of residual reaction products would remain as the application of the reaction products is highly targeted and focussed. The remaining residual reaction products could then act to disinfect or neutralise larger pollutants. This would result in reduced pressure losses and energy savings in pumping the polluted water or liquid system. Or, a more efficient AOP system would allow the applied voltage or current to be reduced resulting in reduced power usage.

A beneficial modification to the present invention is that the single or multiple layers of electrode pair(s) or electrode group(s) or even the filtration element itself may be split into sub sections with non-conducting isolating spacer's in-between thereby effectively providing a number of sub electrode pairs or electrode groups or sub filter elements arranged in parallel. The dimensions of the non-conducting isolating spacers can then be adjusted manually or automatically to fine tune the active areas and the water or liquid velocity in the vicinity of the electrode pair(s) or electrode groups and filter element depending on the application. Additional benefits of this are that multiple current distributers (or electrical bus bars) can be included along the entire length of the electrode pairs or electrode groups in order to distribute the electrical current more evenly over the entire electrodes, thereby avoiding hot spots (due to local differences in electrical resistance) in the electrodes and promoting a more uniform generation of the reaction products.

Thus, in the present invention, highly advantageous effects are obtained resulting from a combination of reduced water or liquid velocities and increased residence times of the highly reactive reaction products, in addition, certain tightly integrated configurations of the invention ensure that the pollutants are in very close vicinity to the location where the reaction products are generated. This feature is of great benefit since the highly reactive OH. radicals are very short lived and thus as the treatment efficiency of the reaction products is increased, a comparable reduction in power consumption may be obtained.

The present invention also relates to a process for the treatment of a water or liquid polluted with organisms and organic and non-organic contaminants covering a wide range of flow-rates from very high to very low volumetric flow-rate through the process apparatus in which the treatment is applied, said water or liquid also having a wide range of very high or very low conductivity properties from almost non-conductive to highly conductive.

As described, the process apparatus provides treatment of polluted water or liquid through the use of an integrated physical solid-liquid separation step and a chemical disinfection step with an AOP. The solid-liquid separation step physically removes the majority of larger pollutants above a certain filtration size while the AOP produces OH. radicals and other reactive oxidative species to treat the polluted water with a chemical disinfection step. Exposure of the organisms and organic and non-organic pollutants to the highly reactive products of the AOP effectively and efficiently neutralises the pollutants through oxidation. In addition, more persistent but not as reactive oxidative species such as Chlorine or Total Residual Oxidants may also be produced.

The flow-rate range of polluted water or liquid flow-rate per square meter of the filtration surface of the filtration element is large and depends on the filtration size selected and the tolerated pressure losses in the system.

Depending on the application, it may be beneficial to increase the turbulence in the vicinity of the electrodes since turbulence increases mixing and thus mass transfer is promoted and improved.

As described herein, the single or multiple layers of electrode pair(s) or electrode groups or filter element itself may be split into sub-sections with non-conducting isolating spacers in-between and the dimensions of the non-conducting isolating spacers can then be adjusted manually or automatically to fine tune the active areas (by blocking off some of the normal flow paths) of the electrode pair(s) or electrode groups or filtration element depending on the application. Adjustment of the active electrode areas allows adjustment of the water or liquid velocity and thus and increase or decrease in turbulence for a given flow-rate. Additionally, the surface of the electrodes may be scratched, provided with protuberances, embossed or patterned to roughen and increase the local turbulence near the electrodes, however, the velocity and turbulence levels should not be so high as to cause unwanted pressure losses or cavitation in the process apparatus.

The process apparatus can be linked to a control system such as a PLC and may be supervised locally by means of a PC or preferably supervised remotely for instance in a central control room. This allows the operation sequences, status messages and alarms to be controlled, monitored and recorded. A chemical measuring device, for example a Chlorine or TRO measurement device can be incorporated to continuously monitor any residual chemical concentrations or other variables following the process apparatus and adjustments can be automatically made to the applied electrical voltage and current depending on the local polluted water or liquid conditions.

The pressure, flow-rate, temperature, pH and conductivity and other variables of the polluted water or liquid at various locations may also be measured and the control system may then automatically act to switch between DSA or BDD anodes when needed as described above or adjust the voltage and current as required. Or, occasionally, it may be desirable to adjust the conductivity or pH or other properties of the polluted water or liquid with additives or neutralisers before it enters the process apparatus or when the treated water or liquid leaves. A relatively small amount of residual chemicals may find their way out with the backwash flow from the automatic backwashing mechanism to the environment if this is incorporated, in this case various properties of the backwash flow may be monitored and a neutralisation or conditioning unit may also be included to ensure that the disposed of water or liquid is neutralised or conditioned on demand and is safe for disposal.

Additional components may be added to the treatment process to condition, remove or enhance the treatment process such as the addition of a Hydrogen removal system (or removal of other substances) or addition of a vacuum pump to the backwashing filtration process which effectively boosts the pressure differential utilised in the automatic backwashing process and thus it's cleaning ability. As mentioned above, if the backwash flow contains unwanted residual chemicals, an appropriate neutralisation component can be included to neutralise the backwashing flow before disposal.

In certain cases, it may be desirable to operate the AOP with pulsed electrical current to further improve the treatment of the polluted water or liquid. The pulsed load may be discrete, triangular, sinusoidal or stepwise and may or may not vary over time.

Thus both large and small water or liquid volumes can be effectively and efficiently treated. The novel process apparatus according to the present invention is advantageously scalable from very low flow-rates to very high flow-rates by simply adjusting the number of filtration elements arranged in parallel and the diameter and/or lengths of the filtration elements within the same common housing having a common inlet/outlet. Simultaneously, the number and dimensions of the electrode pairs or electrode groups are also adjusted to suit. However, in certain cases it may be desirable to recirculate the once treated polluted water or liquid through the novel process apparatus a number of times in order to reduce the foot print of the novel process apparatus or to install entirely separate process apparatus units in series or parallel as a battery.

The invention disclosed herein also relates to the use of the novel process apparatus for the treatment of particularly, but not exclusively, waters used in potable water production including treatment of water from natural, domestic and industrial processes, waters used in upstream and produced water from oil/gas exploration, in waters carried or used on spacecraft or waters carried or used by commercial, public and private transport or waters carried or used in offshore installations and the invention is especially useful when applied to sea water applications, waste water applications and aqua-culture applications all of which may be found on land, on transport or on floating or permanent units such as floating aquaculture installations (fish farms) or oil rigs and can be applied to other installations associated with the production of oil and gas.

The novel process apparatus may also be effectively applied to industrial areas such as food and drink processing, mineral and slurry processing, pharmaceutical processing, chemical processing and power generation applications such as processing of cooling water for power stations or cooling water for engines or cooling water for heating/ventilation or cooling water for refrigeration or heat exchangers and is not limited to water based liquids alone but could also be used to treat acids and alkalis with a differing chemical disinfection step and different electrode materials and configurations if required.

Additional application areas may be the treatment of pesticides, removal of surfactants (for example oil spills), colouring adjustment, pharmaceutical pre-treatment (for example for end use in clean rooms), and removal of endocrine disrupting chemicals, toxic organic compounds, raw water disinfection, membrane cleaning sequences, fire fighting water, treatment of water to provide growth prevention in sea chests and intake caissons to heat exchangers to name but a few. The invention may also be used for the treatment of wastewater or seawater polluted with radioactivity such as deactivation or neutralisation of radioactive elements and particles.

Additional quantities of chemicals, additives or gases could be introduced before or in the vicinity of the electrodes, for example, through porous electrodes or via the non-conducting isolating spacers. The additional quantities of chemicals, additives or gases could be chosen to produce preferential chemical reactions or to produce useful by-products. For example, excess Oxygen gas introduced in this way could react with the produced Hydrogen at the cathode to minimise the free Hydrogen gas, or, Carbon and other chemicals could be introduced that react with the produced Hydrogen at the cathode to produce useful Hydrocarbons or its derivatives for use as fuel. Similarly, additional chemicals or additives or gases could be introduced in the vicinity of the electrodes to react with the other produced chemicals in the same way.

Embodiments will now be described in more detail and with reference to the figures.

Turning to the figures, FIG. 1a illustrates how an electrode pair may be aligned in a novel non-obvious way to the filtration element.

The filtration element is described herein interchangeably as a semi-permeable hollow member.

In this Figure the filtration element 1 is arranged so that the polluted water or liquid flow is from inside the filtration element to outside the filtration element. However, as described herein the reverse arrangement could also be true. The electrode pair in this case is arranged so that once passing through the filtration element 1 the polluted water or liquid flow first encounters the positive anode 2 and then the negative cathode 3. The electrolysis zone 4 between the positive anode 2 and negative cathode 3 is highlighted. Electrical connections are not shown and the drawing dimensions are exaggerated for clarity.

Figure 1B:
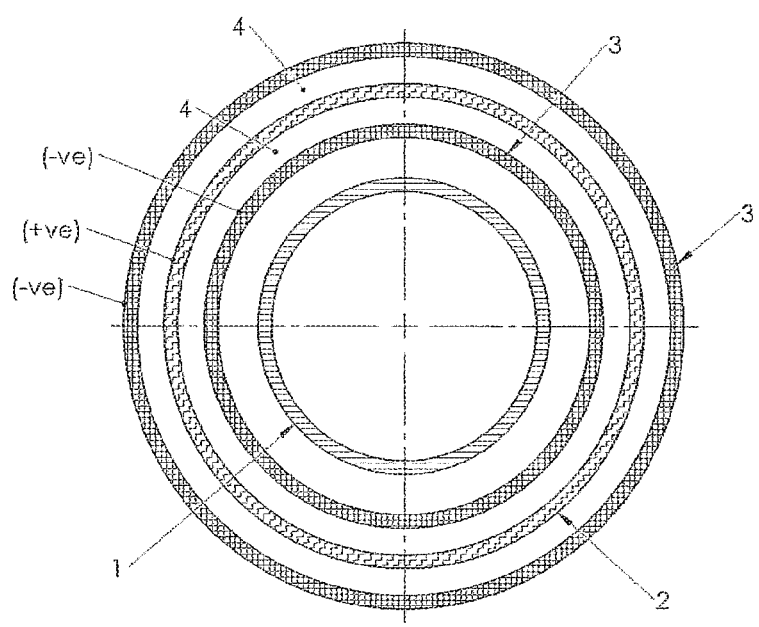

FIG. 1b illustrates how an electrode group may be aligned in a novel non-obvious way to the filtration element in a loosely integrated fashion. In this Figure the filtration element 1 is arranged so that the polluted water or liquid flow is from inside the filtration element to outside the filtration element. However, the reverse arrangement could also be true. The electrode group in this case is arranged so that once passing through the filtration element 1 the polluted water or liquid flow first encounters a negative cathode 3 then a positive anode 2 and then a negative cathode 3. The multiple electrolysis zones 4 between the positive anode 2 and negative cathodes 3 are highlighted. Electrical connections are not shown and the drawing dimensions are exaggerated for clarity.

Figure 1C:
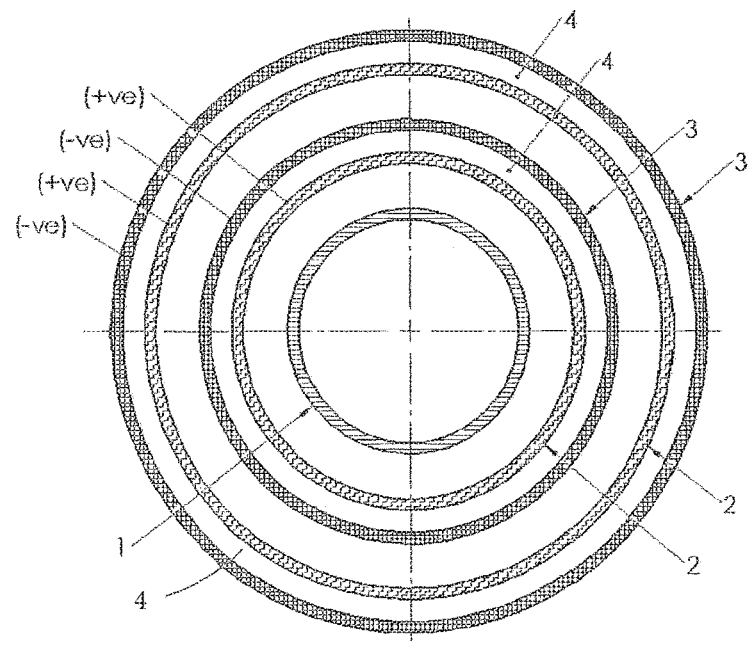

FIG. 1c illustrates how multiple electrode pairs (or electrode groups) may be aligned in series in a novel non-obvious way to the filtration element. In this Figure the filtration element 1 is arranged so that the polluted water or liquid flow is from inside the filtration element to outside the filtration element. However, the reverse arrangement could also be true. The multiple electrode pairs (or groups) in this case are arranged separately so that once passing through the filtration element 1 the polluted water or liquid flow first encounters a positive anode 2 and then the negative cathode 3 of the first electrode pair. Further treatment is then applied by the second electrode pair (or group) with the water or liquid encountering the positive anode 2 of the second electrode pair and then the negative cathode 3 of the second electrode pair (or group). In a similar fashion, multiple electrode pairs (or groups) may be arranged. The multiple electrolysis zones 4 between the electrode pairs (or groups) are highlighted. Electrical connections are not shown and the drawing dimensions are exaggerated for clarity.

Figure 1D:
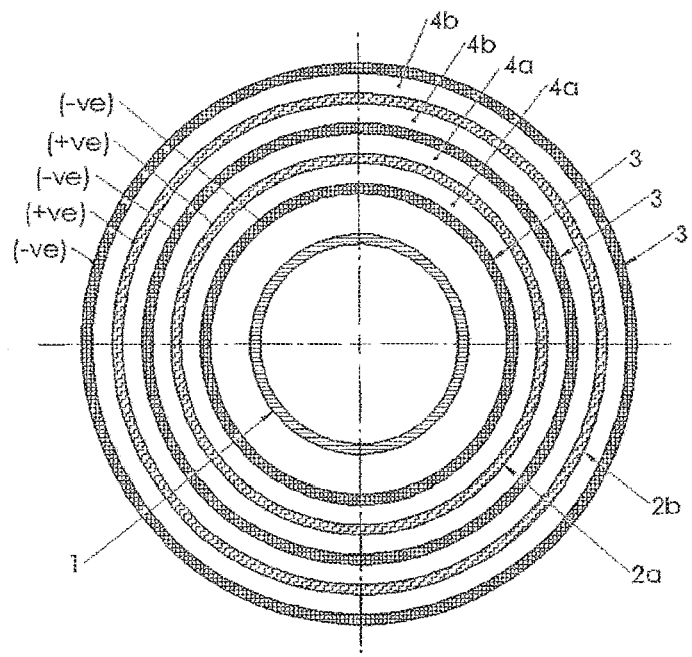

FIG. 1d illustrates how multiple electrode groups (or pairs) may be aligned in series in a novel non-obvious way to the filtration element in a loosely integrated fashion. In this Figure the filtration element 1 is arranged so that the polluted water or liquid flow is from inside the filtration element to outside the filtration element. However, the reverse arrangement could also be true. The multiple electrode groups (or pairs) in this case are arranged partially overlapping and the positive anodes are made from two or more different materials, for example a BDD anode 2a and a DSA anode 2b. The negative cathodes 3 are made from a common material and share the central negative cathode. The multiple electrode groups (or pairs) are arranged so that once passing through the filtration element 1 the polluted water or liquid flow first encounters a negative cathode 3 and then a positive anode 2a and then the negative cathode 3 of the shared negative cathode. Further treatment is then applied as the polluted water or liquid encounters the positive anode 2b of the second electrode set and then the negative cathode 3 of the second electrode set. In a similar fashion, multiple electrode groups (or pairs) may be arranged. The multiple electrolysis zones 4a and 4b between the electrode groups (or pairs) is highlighted. Electrical connections are not shown and the drawing dimensions are exaggerated for clarity.

As discussed above, the advantage of the arrangement of FIG. 1d (or 1c) is that either of the electrode groups (or pairs) may be energised while the others are not, or both of the electrode groups (or pairs) may be energised at the same time. Depending on the material and geometrical structure of the electrodes and applied voltage and current varying levels of reaction products may be generated, the quantities of which being matched to the application in hand. This would allow the for instance the possibility of treating very low conductivity waters or liquid with OH. radicals produced by the BDD electrodes or treatment from the production of reaction products such as Chlorine or Total Residual Oxidants (TRO) with the less expensive DSA electrodes in more conductive waters or liquid. Or, both types of reaction products may be generated simultaneously.

Figure 1E:
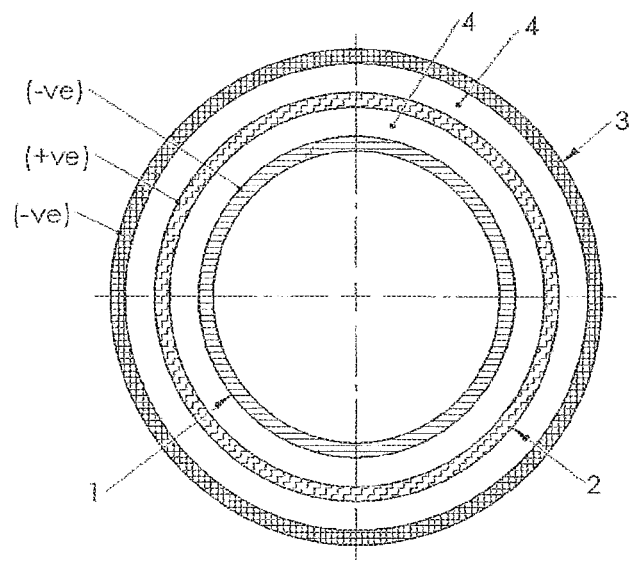

FIG. 1e illustrates how an electrode group may be aligned in a novel non-obvious way to the filtration element in a tightly integrated fashion. In this Figure the filtration element 1 is arranged so that the polluted water or liquid flow is from inside the filtration element to outside the filtration element. However, the reverse arrangement could also be true. The electrode group in this case is arranged so that the filtration element itself acts as a negative cathode and once passing through the negative filtration element cathode 1 the polluted water or liquid flow then encounters a positive anode 2 and then a negative cathode 3. The multiple electrolysis zones 4 between the negative filtration element cathode 1 and the positive anode 2 and negative cathode 3 are highlighted. Electrical connections are not shown and the drawing dimensions are exaggerated for clarity.

Figure 1F:
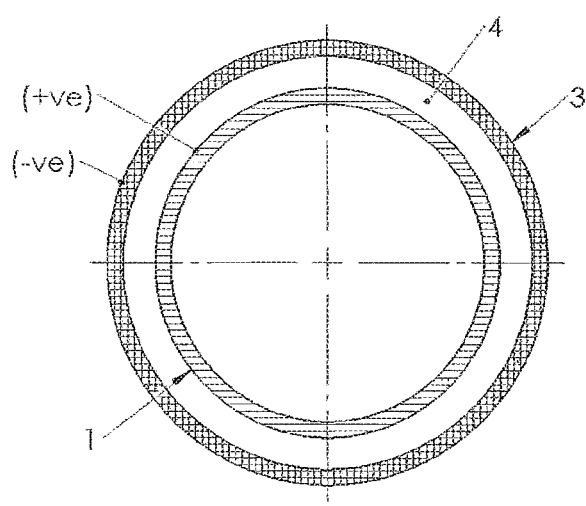

FIG. 1f illustrates how an electrode pair may be aligned in a novel non-obvious way to the filtration element in a tightly integrated fashion. In this Figure the filtration element 1 is arranged so that the polluted water or liquid flow is from inside the filtration element to outside the filtration element. However, the reverse arrangement could also be true. The electrode pair in this case is arranged so that the filtration element itself acts as a positive anode and once passing through the positive filtration element anode 1 the polluted water or liquid flow then encounters a negative cathode 3. The electrolysis zones 4 between the positive filtration element anode 1 and the negative cathode 3 are highlighted. Electrical connections are not shown and the drawing dimensions are exaggerated for clarity.

As discussed above, the arrangement shown in FIG. 1e would provide the benefit of ensuring that the pollutants are in very close proximity to (and thus much more likely to be reacted with) the reaction products generated at the cathode if so desired. Or the arrangement shown in FIG. 1f provides an extremely advantageous effect since the pollutants are effectively forced to be in very close proximity to (and thus are much more likely to be reacted with) the highly reactive reaction products at the anode, i.e. the OH. radicals.

In this tightly integrated configuration the integrated sub systems become wholly reliant on each other for operation, since, the filtration element becomes part of the electrolysis unit and the electrolysis unit becomes part of the filtration element. Accordingly, the footprint of the novel process apparatus is reduced. Further, if a more efficient AOP is applied then the filtration size specification may be able to be increased since a greater amount of residual reaction products would remain as the application of the reaction products is highly targeted and focussed. The remaining residual reaction products could then act to disinfect or neutralise larger pollutants. This would result in reduced pressure losses and energy savings in pumping the polluted water or liquid system. Or, a more efficient AOP system would allow the applied voltage or current to be reduced resulting in reduced power usage.

Figure 1G:
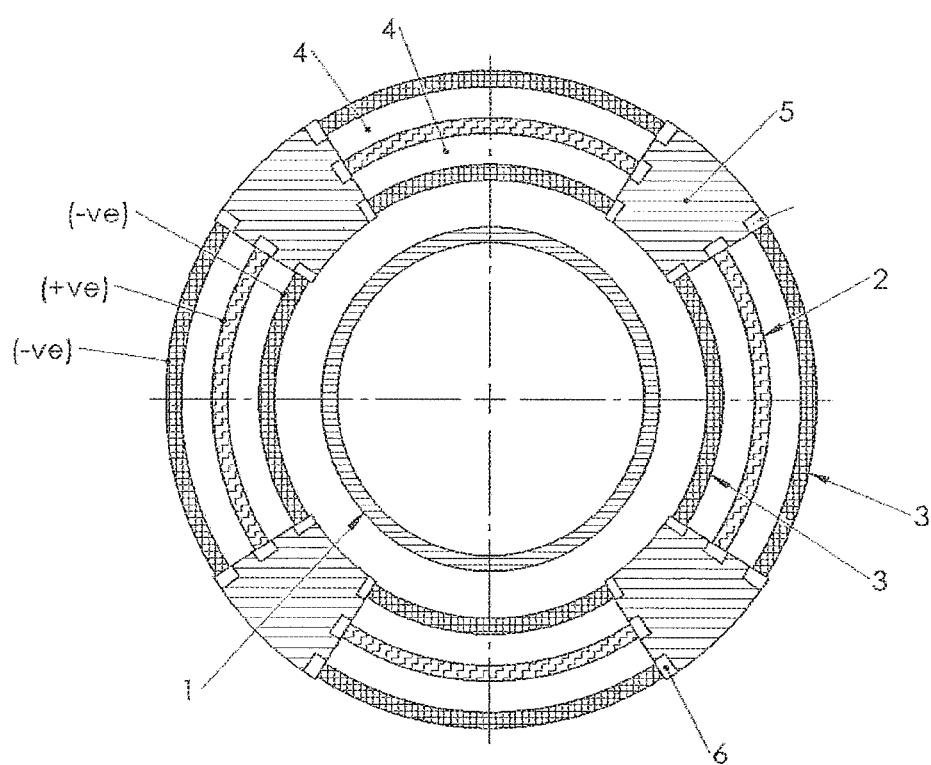

FIG. 1g illustrates how an electrode pair or electrode group may be aligned in a novel non-obvious way to the filtration element to provide a beneficial modification to the present invention. In this Figure the filtration element 1 is arranged so that the polluted water or liquid flow is from inside the filtration element to outside the filtration element. However, the reverse arrangement could also be true. The electrode group in this case is arranged so that once passing through the filtration element 1 the polluted water or liquid flow first encounters a negative cathode 3 then a positive anode 2 and then a negative cathode 3. The multiple electrolysis zones 4 between the positive anode 2 and negative cathodes 3 are highlighted. Electrical connections are not shown and the drawing dimensions are exaggerated for clarity.

However, in FIG. 1g the single or multiple layers of electrode pair(s) or electrode group(s) are split into sub sections with non-conducting isolating spacer's 5 in-between thereby effectively providing a number of sub electrode pairs or electrode groups arranged in parallel. It is also possible that the filtration element itself 1 may also be split into sub-sections in the same way, however this is not shown. The dimensions of the non-conducting isolating spacers 5 can then be adjusted manually or automatically to fine tune the active electrode (and filtration) areas and the water or liquid velocity in the vicinity of the electrode pair(s) or electrode group(s) depending on the application. Additional benefits of this are that multiple current distributers (or electrical bus bars) 6 can be included along the entire length of the electrode pairs or electrode groups in order to distribute the electrical current more evenly over the entire length of the electrodes, thereby avoiding hot spots (due to local differences in electrical resistance) in the electrodes and promoting a more uniform generation of the reaction products.

Although in FIG. 1g, the individual electrodes are shown curved, the electrodes (and even the filtration element itself if that too is split into sub-sections) may be manufactured as flat parts in order to ease manufacturing and reduce the cost of the electrodes. Viewed from the same aspect it would appear that the electrodes (and even the filtration element itself) are formed in a polygon type of shape (or approximate circle) having a number of discrete flat sides.

Depending on the application, it may be beneficial to increase the turbulence in the vicinity of the electrodes since turbulence increases mixing and thus mass transfer is promoted and improved. Manual or automatic adjustment of the dimensions of the non-conducting isolating spacers 5 may then adjust the active electrode areas (and even the filtration element itself if that too is split into sub-sections) allowing adjustment of the water or liquid velocity and thus and increase or decrease in turbulence for a given flow-rate. Additionally, the surface of the electrodes may be scratched or embossed or patterned to roughen and increase the local turbulence near the electrode pairs or electrode groups.

FIGS. 2a to 2d illustrate the typical arrangement described FIG. 1g in more detail. In this case the arrangement of FIG. 1g is installed in a housing 7 having a main inlet 8 and main outlet 9 into which the polluted water or liquid enters and exits. The filtration element 1 is arranged so that the polluted water or liquid flow is from inside the filtration element to outside the filtration element. However, the reverse arrangement could also be true. The electrode group in this case is arranged so that once passing through the filtration element 1 the polluted water or liquid flow first encounters a negative cathode 3 then a positive anode 2 and then a negative cathode 3. The multiple electrolysis zones 4 between the positive anode 2 and negative cathodes 3 are highlighted. Electrical connections are not shown and the drawing dimensions are exaggerated for clarity.

Figure 2A:
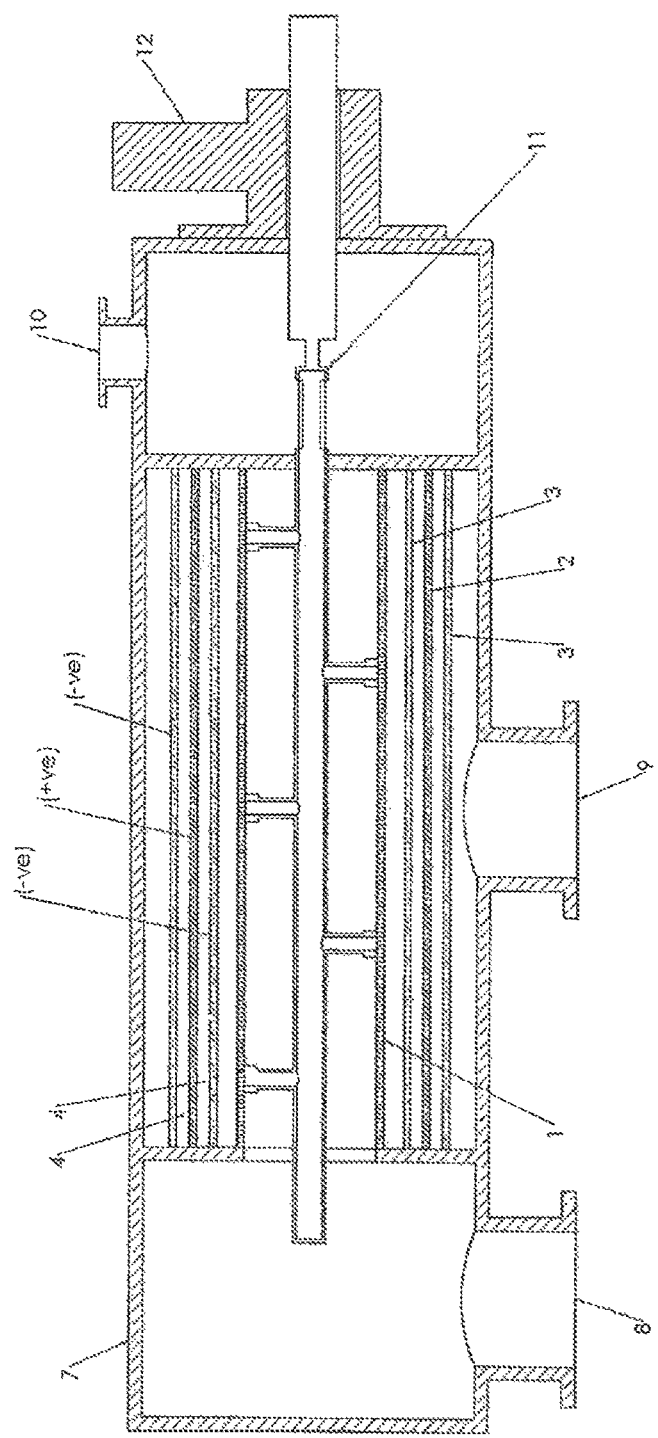
FIGS. 2a to 2d illustrates how the electrode pairs aligned in a novel non-obvious way to the hollow semi-permeable member could be installed in a common housing with the inclusion of an automatic backwashing mechanism.
Figure 2B:
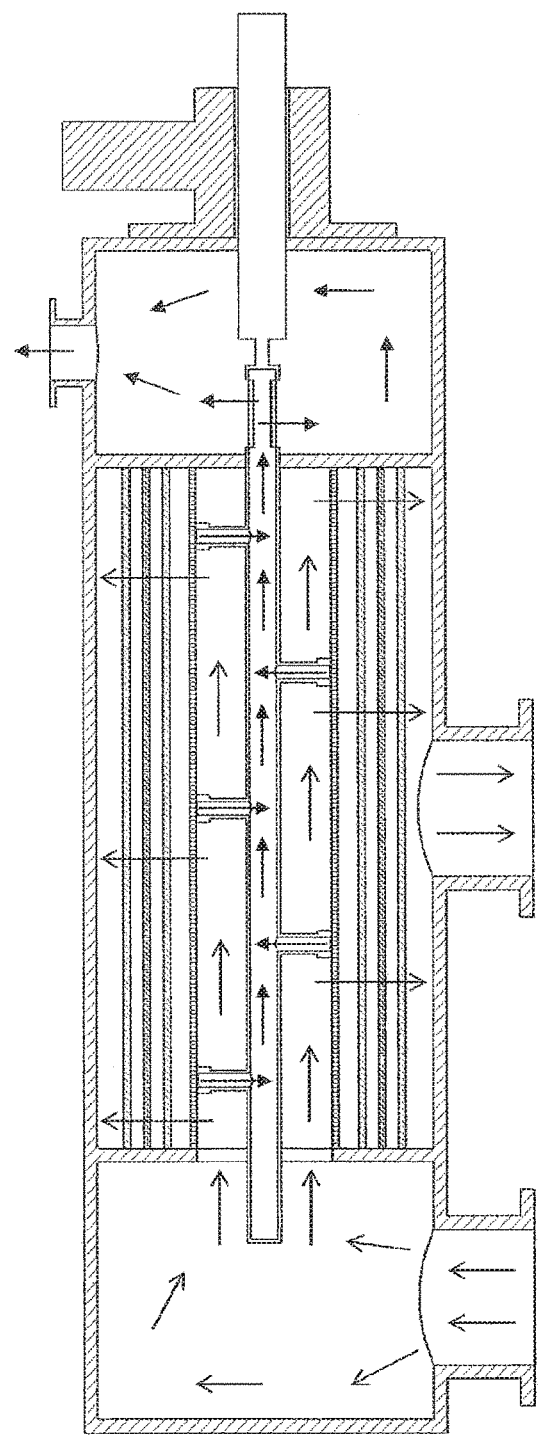
Figure 2C:
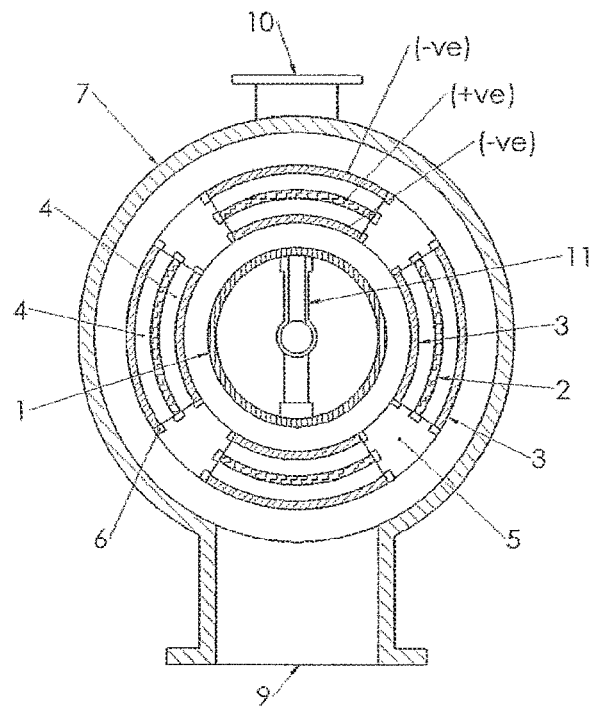
Figure 2D:
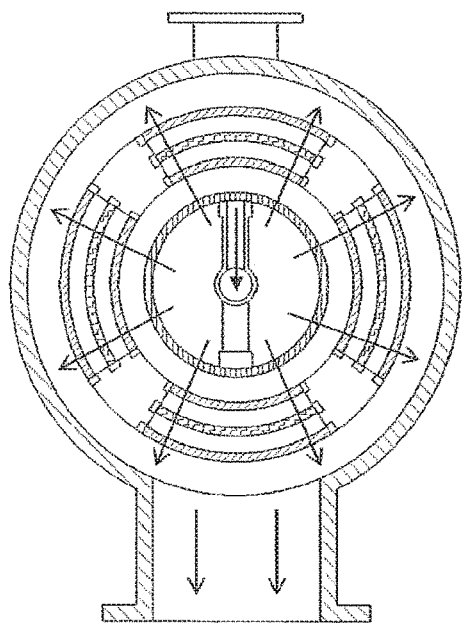

FIGS. 2b and 2d show the direction of the polluted water or liquid flow with non-filled arrows to aid understanding. FIG. 2d being a cross section through the main outlet 9 in FIG. 2b. Although not necessary for certain applications, FIGS. 2a to 2d utilise an automatic backwashing mechanism 11 that is driven by some kind of electrical, air or hydraulic motor 12. The direction of the backwash flow-rate is shown in FIGS. 2b to 2c with filled in arrows. As shown, the backwash flow is evacuated safely through a backwash outlet 10.

The arrangement of the hollow filtration element 1 acts to divert the polluted water or liquid flow in a generally perpendicular or radial direction to and through the filtration element surface of each filtration element. As the area of the filtration element surface is preferably greater in area than the total cross sectional area of the filtration element inlet(s) or outlet(s) to the hollow filtration element, the speed of the water or liquid is significantly reduced in the vicinity of the filtration element surface. This leads to a number of benefits including those described above.

It should be realised that FIGS. 2a to 2d illustrate the invention installed as a novel process apparatus having a single filtration element. Multiple filtration elements may be installed easily in a common housing having a common main inlet and main outlet. FIGS. 2a to 2d also illustrate a filtration element having a circular cross section in order to optimise and simplify the design of the automatic backwashing mechanism, however, it will be recognised from the teaching of the present invention that other filtration cross sections may be utilised and may even be flat.

Figure 2E:
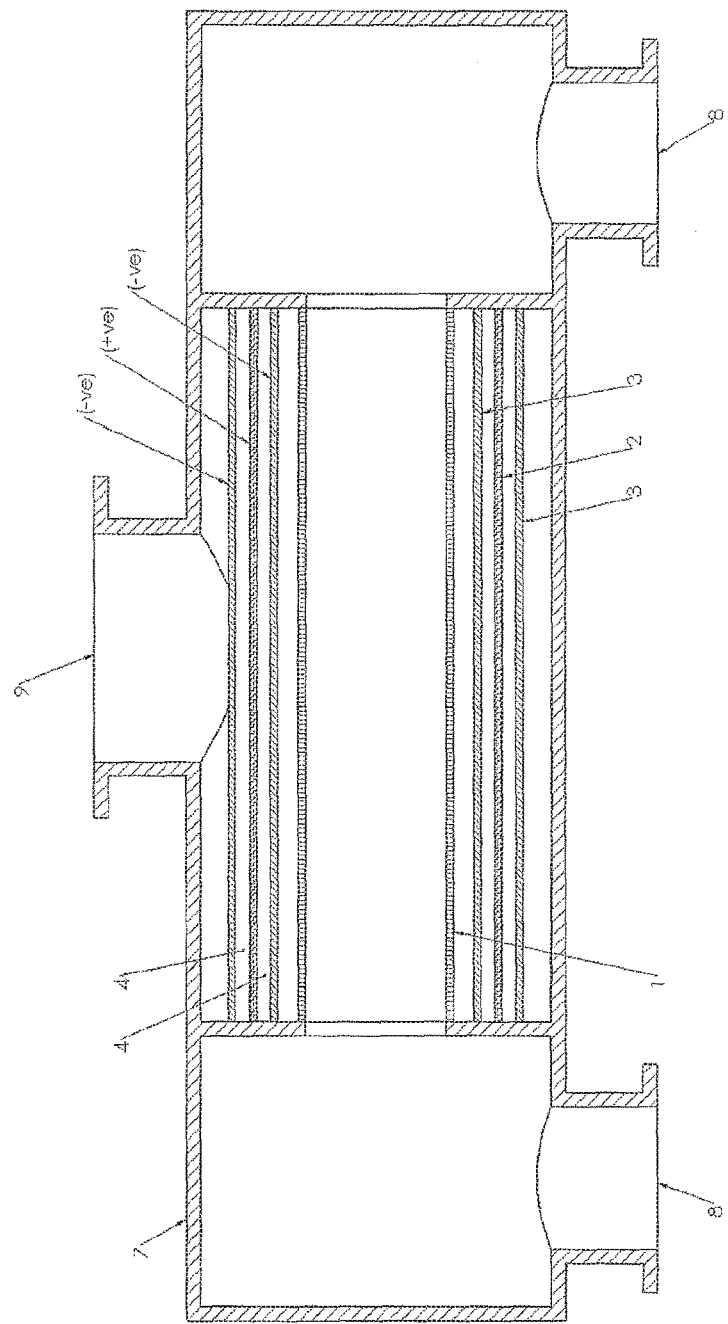
FIGS. 2e and 2f illustrate the process apparatus in cross-section and the flow path of water or liquid without the inclusion of an automatic backwashing mechanism.

FIG. 2e illustrates the particular arrangement described FIG. 1g in more detail. In this case the arrangement of FIG. 1g is installed in a housing 7 having two main inlets 8 and main outlet 9 into which the polluted water or liquid enters and exits. The filtration element 1 is arranged so that the polluted water flow is from inside the filtration element to outside the filtration element. However, the reverse arrangement could also be true. The electrode group in this case is arranged so that once passing through the filtration element 1 the polluted water or liquid flow first encounters a negative cathode 3 then a positive anode 2 and then a negative cathode 3. The multiple electrolysis zones 4 between the positive anode 2 and negative cathodes 3 are highlighted. Electrical connections are not shown and the drawing dimensions are exaggerated for clarity.

Figure 2F:
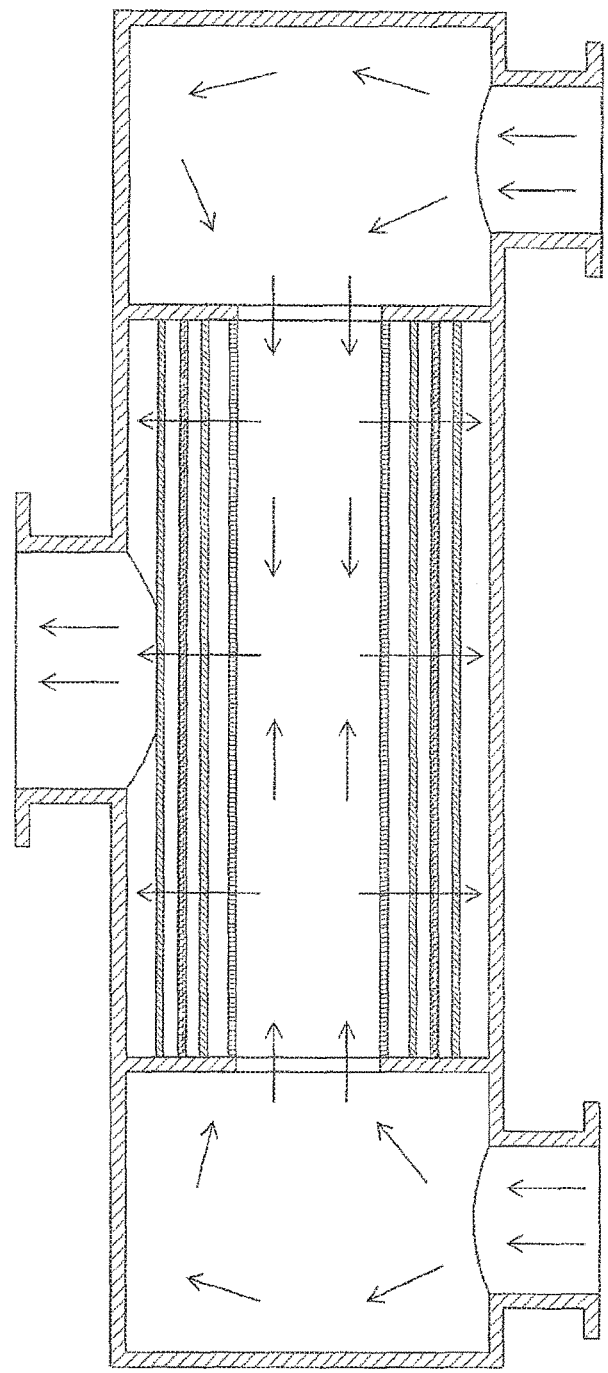

FIG. 2f show the direction of the polluted water or liquid flow with non-filled arrows to aid understanding. In this particular example an automatic backwashing mechanism is not used and either dismantling and manual cleaning or reverse flow flushing may be used to clean the filtration element.

The arrangement of the filtration element 1 acts to divert the polluted water or liquid flow in a generally perpendicular or radial direction to and through the filtration element surface of the filtration element. As the area of the filtration element surface is preferably greater in area than the total cross sectional area of the filtration element inlet(s) or outlet(s) to the hollow filtration element, the speed of the water or liquid is significantly reduced in the vicinity of the filtration element surface. This leads to the benefits described above.

It should be realised that FIGS. 2e to 2f illustrate the invention installed as a novel process apparatus having a single filtration element. Multiple filtration elements may advantageously be installed easily in a common housing having a common main inlet and main outlet. FIGS. 2e to 2f also illustrate a filtration element having a circular cross section in order to optimise and simplify the design of the novel process apparatus. Other filtration cross sections may be utilised and may even be flat.

Figure 3:
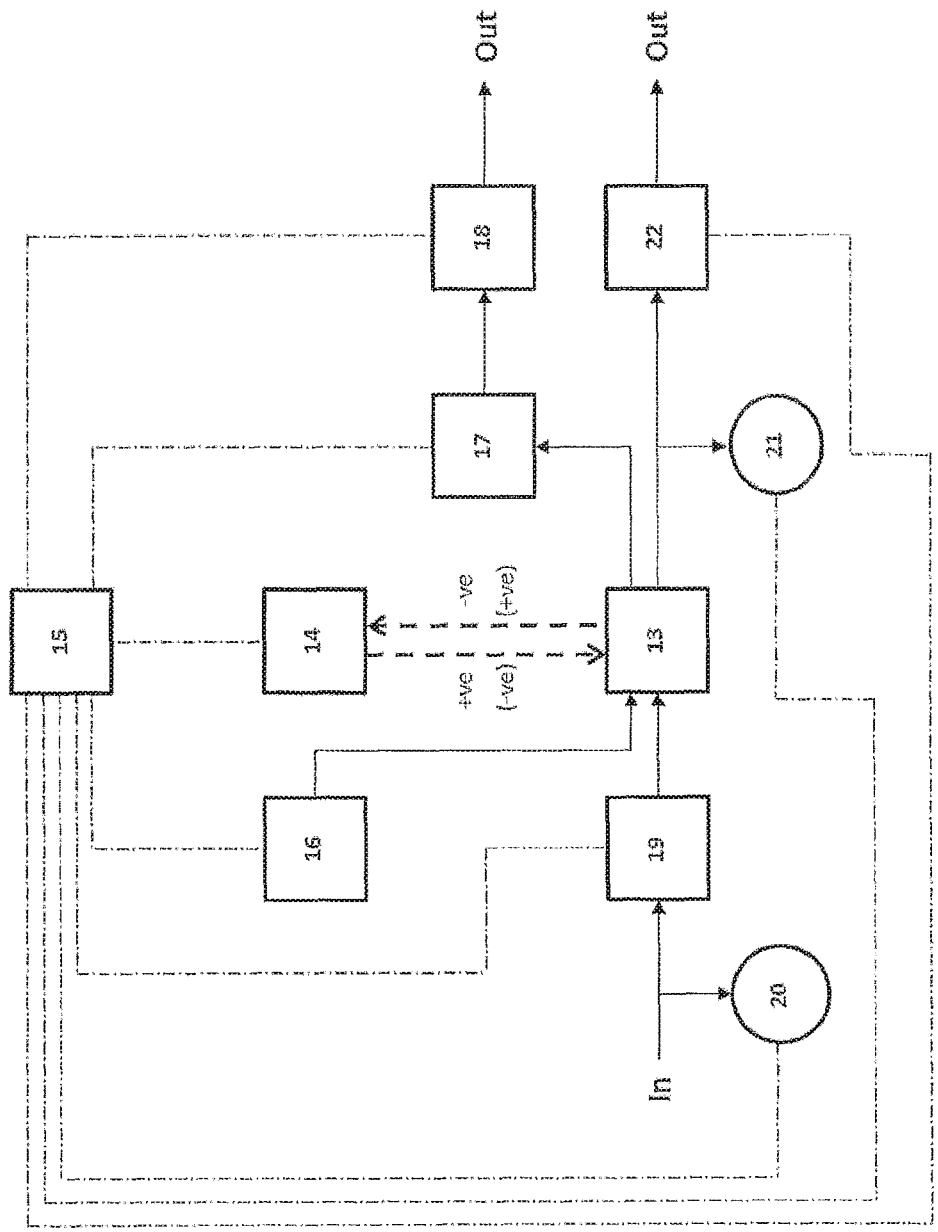
FIG. 3 provides an example of how the process apparatus may be configured in a treatment process for the treatment of a polluted water or liquid.

FIG. 3 provides an example of how the novel process apparatus 13 may be configured in a treatment process for the treatment of very high or very low flowrates polluted water or liquid.

In this example the novel process apparatus 13 is linked to a control system such as a PLC or PC 15. This allows the operation sequences, status messages and alarms to be controlled. The treatment process comprises a means for applying a voltage 14 across the positive anode and negative cathode and the means for supplying a direct current (DC) to the electrode pair(s) or electrode groups(s). The means of applying the voltage and current may be provided by a conventional rectifier or some other method.

The treatment process may preferably incorporate a mechanism for cleaning the electrodes of the novel process apparatus. In particular, to clean the cathode of unwanted cathodic deposits that is typically encountered in electrolytic cells of this nature. This may be achieved by polarity reversal (PR) as shown by the dual +ve and −ve connections in FIG. 3 or by a dedicated CIP unit 16.

A chemical measuring device, for example a Chlorine or TRO measurement device 21 can be incorporated to continuously monitor any residual chemical concentrations or other variables following the novel process apparatus and adjustments can be automatically made to the applied electrical voltage and current depending on the local polluted water or liquid conditions.

The pressure, flowrate, temperature, pH and conductivity and other variables of the polluted water or liquid at various locations 20 may also be measured and the control system may then automatically act to switch between different electrode pairs or sets, e.g. DSA or BDD anodes when needed as described above or adjust the voltage and current as required. Or, occasionally, it may be desirable to adjust the conductivity or pH or other properties of the polluted water or liquid with additives or neutraliser unit 19 before it enters the novel process apparatus.

Additional components 22 may be added to the treatment process to condition, remove or enhance the treatment process such as the addition of a Hydrogen removal system (or removal of other substances) or addition of a vacuum pump 17 to the backwashing filtration process which effectively boosts the pressure differential utilised in the automatic backwashing process and thus it's cleaning ability. As mentioned above, if the backwash flow contains unwanted residual chemicals, an appropriate neutralisation component 18 can be included to neutralise the backwashing flow on demand before disposal.

It will be recognised with the benefit of the teaching of the present application that features of either aspect of inventions described herein may be conveniently used in any suitable combinations. The claim combinations set out below are not therefore limiting.

Additionally the apparatus may be adapted such that circumferential dimension of the electrically isolating spacers described above can be adjusted manually or automatically, both uniformly and non-uniformly. By increasing/reducing the dimension of the respective electrically isolating spacers it is possible to increase/reduce the water or liquid velocity and thus turbulence in the discrete radial flow paths. Turbulence surprisingly improves the performance of the apparatus within the electrolysis zones by increasing mass transfer and chemical reactions.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention

The invention claimed is:

1. A process apparatus comprising at least one filter element, the filter element being an elongate hollow semi-permeable member; at least one anode; and at least one cathode; wherein at least one anode and at least one cathode are semi-permeable, such that liquid can pass therethrough; wherein the anode and cathode are arranged radially and concentrically with respect to the filter element; and wherein the filter element is either: inside of the at least one anode and the at least one cathode, or outside of the at least one anode and the at least one cathode.

2. The process apparatus as claimed in claim 1, wherein adjacent anodes and cathodes alternate between cathode and an anode to define an electrolysis zone therebetween.

3. The process apparatus as claimed in claim 1, wherein the sequence of anode and cathode when viewed radially inwards or outwards from the elongate hollow semi-permeable member is selected from the following:
(i) Cathode, Anode;
(ii) Anode, Cathode;
(iii) Anode, Cathode, Anode;
(iv) Cathode, Anode, Cathode;
(v) Anode, Cathode, Anode, Cathode;
(vi) Cathode, Anode, Cathode, Anode;
(vii) Cathode, Anode, Cathode, Anode, Cathode; or
(viii) Anode, Cathode, Anode, Cathode, Anode.

4. The process apparatus as claimed in claim 1, wherein the anode and or cathode extend around substantially the entire circumference of an adjacent anode or cathode.

5. The process apparatus as claimed in claim 1, wherein circumferentially the anode/cathode is/are divided into discrete sections by means of electrically isolating spacers; and
adjacent anodes and cathodes extend between adjacent electrically isolating spacers.

6. The process apparatus as claimed in claim 5, wherein electrically isolating spacers are provided dividing the apparatus into 2 or more discrete radial flow paths.

7. The process apparatus as claimed in claim 5, wherein the circumferential dimension of the electrically isolating spacers may be manually or automatically increased/reduced in order to increase/reduce the liquid velocity and/or turbulence in the discrete radial flow paths.

8. The process apparatus as claimed in claim 1, wherein one or both ends of said filter element is/are open and arranged in use to permit liquid to flow there-through.

9. The process apparatus as claimed in claim 8, wherein liquid is arranged to flow into the apparatus through one or both ends of the filter element and radially outwards through a wall of the filter element, or wherein liquid is arranged to flow into the apparatus radially inwards through a wall of the filter element and out of the apparatus along the elongate axis of the filter element.

10. The process apparatus as claimed in claim 1, wherein at least one anode and cathode are elongate and each arranged circumferentially and radially around or within the filter element.

11. The process apparatus as claimed in claim 1, wherein at least one anode and adjacent cathode are activated by means of an electrical supply arranged in use to generate potential difference and an electrical current between an anode and an adjacent cathode.

12. The process apparatus as claimed in claim 11, comprising pairs of adjacent anodes and cathode defining electrode pairs or groups; and
wherein electrode pairs or groups may be independently and selectively electrically activated.

13. The process apparatus as claimed in claim 12, wherein the anode and/or cathode substrate and/or coatings material for one electrode pair or group is/are the same or dissimilar to the anode and/or cathode substrate and/or coating material of another electrode pair or group.

14. The process apparatus as claimed in claim 1, wherein the at least one anode is formed of a conductive substrate and an outer coating.

15. The process apparatus as claimed in claim 14, wherein the anode is a dimensionally stable anode formed of a substrate coated with precious metals selected from platinum, gold, silver or a mixed metal oxide solution.

16. The process apparatus as claimed in claim 14 wherein the anode is a boron doped diamond anode formed from a substrate coated with boron doped diamond.

17. The process apparatus as claimed in claim 1, wherein the at least one cathode is formed of a conductive substrate and optionally an outer coating.

18. The process apparatus as claimed in claim 1, said apparatus comprises a controller arranged to control electrical activation of the at least one anode and cathode; and at least one detector arranged to measure a property of a liquid flowing through the apparatus, wherein the controller is adapted to independently control anodes and cathodes in response to a signal received from said detector.

19. The process apparatus as claimed in claim 18, wherein the detector is adapted to detect the conductivity of the liquid.

20. The process apparatus as claimed in claim 18, wherein the detector is adapted to detect residual concentrations of chemicals selected from oxidants in the water or liquid including as Fluorine, Hydroxyl free radicals, forms of Oxygen, Ozone, Hydrogen Peroxide, Hypochlorite, Chlorine and Total Residual Oxidants.

21. The process apparatus as claimed in claim 1, comprising a plurality of filter elements and plurality of cathode and anode pairs associated therewith.

22. The process apparatus as claimed in claim 1, comprising a single filter element and associated anodes and cathode and further comprising a housing having an inlet and an outlet and adapted to communicate liquid from said inlet through said filter element, through or proximate to the anodes and cathodes, and to said outlet.

23. The process apparatus as claimed in claim 1, comprising a plurality of elongate hollow members and associated anodes and cathode and further comprising a housing having an inlet and an outlet and adapted to communicate liquid from said inlet through said plurality of elongate hollow semi-permeable members, through or proximate to anodes and cathodes, to said outlet.

24. A method of processing a liquid by causing a liquid to pass through an apparatus as claimed in claim 1.

* * * * *